(12) United States Patent
Ishikawa et al.

(10) Patent No.: US 8,377,303 B2
(45) Date of Patent: Feb. 19, 2013

(54) MEMBRANE CARTRIDGE

(75) Inventors: Kimihiro Ishikawa, Amagasaki (JP);
Kazuhiro Yamazaki, Amagasaki (JP);
Tomohiko Sasaki, Amagasaki (JP);
Yoshio Matsuzaki, Amagasaki (JP)

(73) Assignee: Kubota Corporation (JP)

( * ) Notice: Subject to any disclaimer, the term of this patent is extended or adjusted under 35 U.S.C. 154(b) by 36 days.

(21) Appl. No.: 13/063,043

(22) PCT Filed: Sep. 17, 2009

(86) PCT No.: PCT/JP2009/004665
§ 371 (c)(1),
(2), (4) Date: Mar. 9, 2011

(87) PCT Pub. No.: WO2010/035436
PCT Pub. Date: Apr. 1, 2010

(65) Prior Publication Data
US 2011/0163025 A1    Jul. 7, 2011

(30) Foreign Application Priority Data
Sep. 26, 2008  (JP) ................................ 2008-247491

(51) Int. Cl.
*B01D 63/08* (2006.01)
*B01D 63/00* (2006.01)
(52) U.S. Cl. .............. 210/321.75; 210/232; 210/321.72; 210/321.84; 210/456
(58) Field of Classification Search .................. 210/232, 210/321.72, 321.75, 321.84, 456
See application file for complete search history.

(56) References Cited

U.S. PATENT DOCUMENTS

| 4,500,426 A | 2/1985 | Ishii et al. ................... 210/321.3 |
| 5,651,888 A | 7/1997 | Shimizu et al. .......... 210/321.64 |
| 2003/0010690 A1 | 1/2003 | Okajima et al. ............. 210/151 |

FOREIGN PATENT DOCUMENTS

| JP | 62-204802 | 9/1987 |
| JP | 06-039250 | 2/1994 |
| JP | 6-178920 | 6/1994 |
| JP | 08-281264 | 10/1996 |
| JP | 09-299969 | 11/1997 |
| JP | 2003-117358 | 4/2003 |
| JP | 2004-121905 | 4/2004 |
| JP | 2007-268388 | 10/2007 |

(Continued)

OTHER PUBLICATIONS

English translation Japanese Patent Application No. 2003-117358A.*

(Continued)

*Primary Examiner* — John Kim
(74) *Attorney, Agent, or Firm* — Kusner & Jaffe

(57) ABSTRACT

A channel groove pattern 38 allowing the passage of a permeated liquid having passed through a filtration membrane 37 is provided on one filtration plate surface of a filtration plate 36, and a permeated liquid outlet nozzle 39 is provided on the filtration plate 36. The channel groove pattern 38 includes multiple channel grooves 38*a*, and a header groove 44 for averaging suction pressures is formed on the filtration plate 36. An area where the channel groove pattern 38 is formed is divided into upper and lower water collection areas 46 and 47 by the header groove 44. The permeated liquid outlet nozzle 39 and the header groove 44 communicate with each other through the channel grooves 38*a* of the water collection area 46, and the channel cross-sectional area of the header groove 44 is larger than that of the channel groove 38*a*.

6 Claims, 12 Drawing Sheets

FOREIGN PATENT DOCUMENTS

JP 2008-073680 4/2008

OTHER PUBLICATIONS

English translation Japanese Patent Application No. 2007-268388A.*

Int'l Search Report from corresponding Int'l Patent Application No. PCT/JP2009/004665, 2 PAGES.
Supplementary European Search Report from corresponding European Patent Application No. EP 09 81 5858, 2 pages.

* cited by examiner

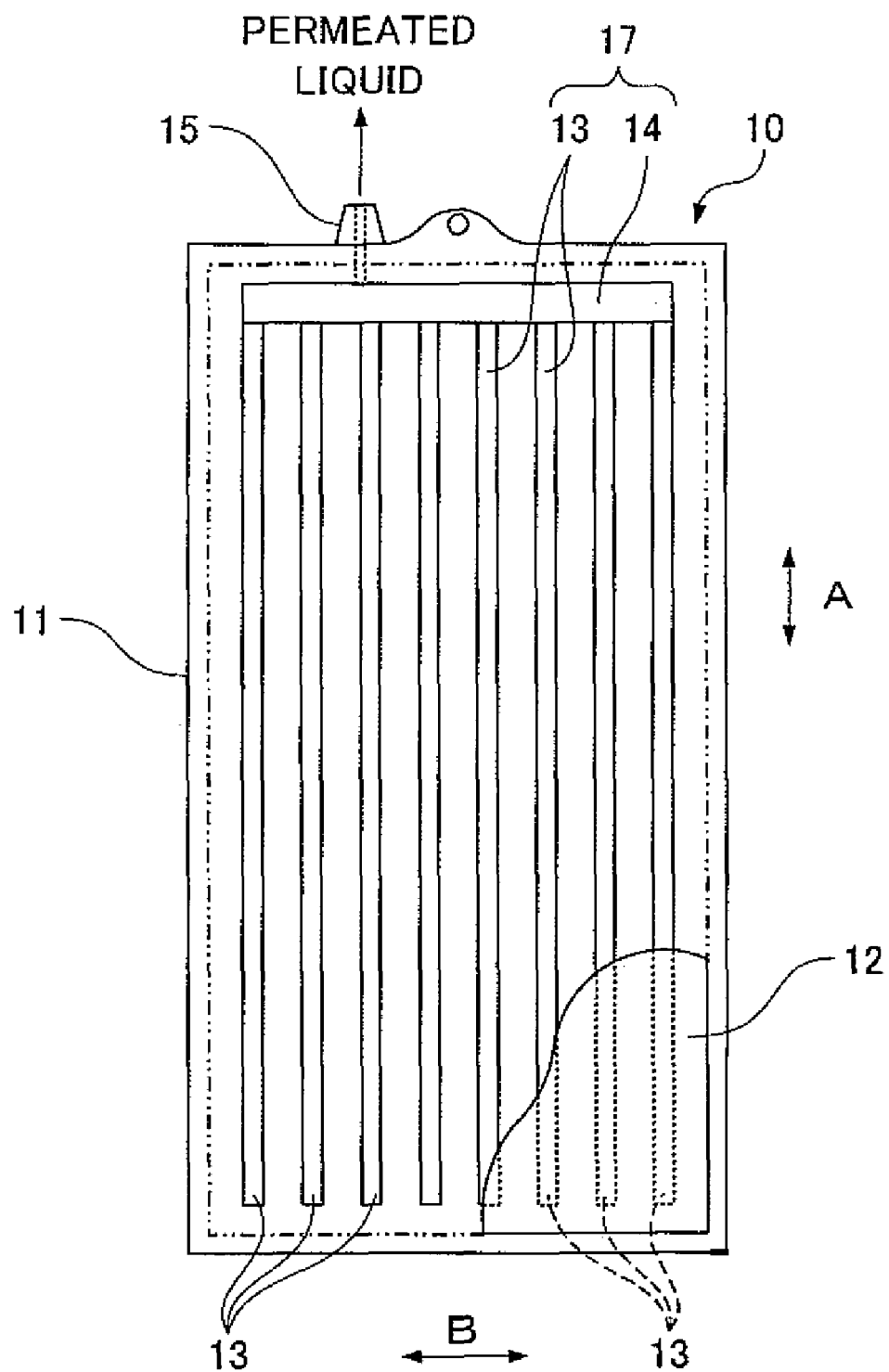

MEMBRANE CARTRIDGE

TECHNICAL FIELD

The present invention relates to a membrane cartridge constituting a submerged membrane separator used for, e.g., solid-liquid separation of activated sludge or the like.

BACKGROUND ART

In the related art, e.g., in a membrane bioreactor system, a submerged membrane separator is submerged in a reaction tank where activated sludge treatment is performed on sewage or the like. In such a membrane separator, multiple membrane cartridges of an organic flat-membrane type are arranged in parallel at predetermined intervals in the main-unit casing.

As shown in FIGS. 9 and 10, a membrane cartridge 10 includes a rectangular filtration plate 11 extended in vertical direction A and filtration membranes 12 provided on both surfaces of the filtration plate 11.

Further, channel grooves 13 are formed on both surfaces of the filtration plate 11. A permeated liquid having passed through the filtration membranes 12 flows through the channel grooves 13. The channel grooves 13 are extended in the vertical direction A (longitudinal direction) and are arranged in parallel in width direction B of the filtration plate 11.

On the upper end of the filtration plate 11, a liquid collection part 14 for collecting the permeated liquid in the channel grooves 13 is formed. The liquid collection part 14 penetrates both filtration plate surfaces of the filtration plate 11 and the upper ends of the channel grooves 13 communicate with the liquid collection part 14. Moreover, the channel grooves 13 and the liquid collection part 14 constitute a permeated liquid channel 17. On the upper edge of the filtration plate 11, a permeated liquid outlet nozzle 15 is provided through which the permeated liquid collected in the liquid collection part 14 is discharged out of the membrane cartridge 10.

With this configuration, when the membrane cartridge 10 is used for solid-liquid separation, a suction pressure (negative pressure) is applied to the permeated liquid outlet nozzle 15 by using a suction pump, so that the suction pressure is applied to the permeated liquid channel 17 (i.e., the channel grooves 13 and the liquid collection part 14) through the permeated liquid outlet nozzle 15 and a tank liquid mixture 18 (liquid to be treated) is filtered through the filtration membranes 12. At this point, the filtered liquid having passed through the filtration membranes 12 flows into the liquid collection part 14 through the channel grooves 13 and the liquid collected in the liquid collection part 14 is discharged out of the membrane cartridge 10 from the liquid collection part 14 through the permeated liquid outlet nozzle 15.

For example, the published unexamined patent application of patent literature 1 describes the membrane cartridge 10 in which the channel grooves 13 and the liquid collection part 14 are formed thus on the filtration plate 11.

When a suction pressure is applied to the permeated liquid channel 17 of the membrane cartridge 10, a pressure loss to the permeated liquid outlet nozzle 15 increases toward the lower part of the membrane cartridge 10. FIG. 11 shows suction pressure distribution on the surface of the filtration plate 11. In FIG. 11, constant-pressure lines 19a to 19e each indicate positions having equal pressures. The constant-pressure lines 19a to 19e indicate lower pressures toward the lower part of the filtration plate 11. In the pressure distribution, the constant-pressure lines 19a to 19e are extended downward directly under the permeated liquid outlet nozzle 15 and the suction pressure decreases away from the permeated liquid outlet nozzle 15. Further, in the pressure distribution in the width direction B, the suction pressure decreases away from beneath the permeated liquid outlet nozzle 15 in the width direction B.

CITATION LIST

Patent Literature

Patent literature 1: Japanese Patent Laid-Open No. 8-281264

SUMMARY OF INVENTION

Technical Problem

In the related art, however, as shown in FIG. 11, a pressure difference (pressure distribution, pressure variations) in the width direction B of the filtration plate surface increases toward the lower part of the filtration plate 11. Thus disadvantageously, efficient collection of the permeated liquid becomes more difficult toward lower parts 20 on both sides of the filtration plate 11, so that it is difficult to effectively use the overall surface of the filtration membrane 12 at the same time.

Further, as shown in FIG. 12, one membrane surface of the membrane cartridge 10 may be blocked by, e.g., a deposit 24 of a solid matter formed between the membranes of the adjacent membrane cartridges 10. In this case, filtering is not performed at the blockage of the membrane surface, so that an effective filtration membrane area for obtaining the permeated liquid on one surface of the membrane cartridge 10 is smaller than that of the other surface of the membrane cartridge 10. As a result, an amount of the permeated liquid from the one surface of the membrane cartridge 10 is smaller than that from the other surface of the membrane cartridge 10. In this way, if a blockage occurs on one membrane surface of the membrane cartridge 10, an amount of the permeated liquid from the front side of the membrane cartridge 10 may be different from that from the back side of the membrane cartridge 10.

An object of the present invention is to provide a membrane cartridge which can effectively use filtration membranes by efficiently collecting a permeated liquid, and reduce a difference in the amount of permeated liquid between the front and back sides of the membrane cartridge, the difference being caused by, e.g., a blockage on a membrane surface.

Solution to Problem

In order to attain the object, a first invention is a membrane cartridge constituting a submerged membrane separator, the membrane cartridge including:

a filtration membrane provided at least on one surface of a filtration plate;

a channel groove pattern formed on the surface of the filtration plate covered with the filtration membrane, the channel groove pattern allowing the passage of a permeated liquid having passed through the filtration membrane; and a permeated liquid outlet provided on the circumferential edge of the filtration plate, the permeated liquid outlet collecting and taking out the permeated liquid having passed through the channel groove pattern, wherein the channel groove pattern includes multiple channel grooves, the filtration plate includes a pressure difference reduction groove crossing an area where the channel groove pattern is formed, the area where the channel groove pattern is formed is divided into multiple water collection areas by the pressure difference reduction groove, the pressure difference reduction groove communicates with the permeated liquid outlet through the channel grooves, and the pressure difference reduction groove has a larger channel cross-sectional area than the channel groove.

With this configuration, in solid-liquid separation performed by a membrane cartridge on a liquid to be treated, a suction pressure is applied to the inside of the membrane cartridge through the permeated liquid outlet, so that the liquid to be treated is filtered through the filtration membranes, and the permeated liquid having passed through the filtration membranes flows through the channel grooves and the pressure difference reduction groove and is collected out of the membrane cartridge from the permeated liquid outlet.

At this point of time, the permeated liquid flowing through the channel grooves of the water collection area farther from the permeated liquid outlet than the pressure difference reduction groove is collected to the pressure difference reduction groove from the channel grooves before reaching the permeated liquid outlet. The channel cross-sectional area of the pressure difference reduction groove is larger than that of the channel groove and the pressure difference reduction groove crosses the area where the channel groove pattern is formed, so that the flow velocity of the permeated liquid in the pressure difference reduction groove is lower than the flow velocity of the permeated liquid in the channel grooves.

With this configuration, variations in suction pressure in the water collection area closer to the permeated liquid outlet than the pressure difference reduction groove are averaged and reduced in the longitudinal direction of the pressure difference reduction groove. Thus suction pressures in the water collection area farther from the permeated liquid outlet than the pressure difference reduction groove are averaged in the longitudinal direction of the pressure difference reduction groove, so that the permeated liquid can be effectively obtained by using the overall membrane surface.

According to a second invention, the filtration plate has a shape whose length and width are different, the permeated liquid outlet is provided on or near the upper end of the filtration plate when the filtration plate is placed upright such that the longitudinal direction of the filtration plate is oriented in the vertical direction, and the pressure difference reduction groove is provided from one side to the other side of the filtration plate.

With this configuration, the overall surface of the vertically oriented filtration membrane is effectively used by suppressing variations in suction pressure in the width direction of the filtration plate surface. Since the pressure difference reduction groove is provided from one side to the other side of the filtration plate, variations in suction pressure in the water collection area closer to the permeated liquid outlet than the pressure difference reduction groove are averaged in the width direction of the filtration plate surface by the pressure difference reduction groove. Thus suction pressures in the water collection area farther from the permeated liquid outlet than the pressure difference reduction groove are averaged in the width direction of the filtration plate surface, so that the overall surface of the filtration membrane can be effectively used.

According to a third invention, the channel grooves are linearly formed and arranged in parallel.

With this configuration, the channel resistance decreases when the permeated liquid flows into the channel grooves.

According to a fourth invention, the channel groove pattern includes multiple communication grooves connecting the adjacent channel grooves.

With this configuration, the permeated liquid flows to the permeated liquid outlet through the channel grooves and the communication grooves, and is collected out of the membrane cartridge from the permeated liquid outlet. At this point, the permeated liquid having passed through the filtration membrane in the water collection area farther from the permeated liquid outlet than the pressure difference reduction groove is collected to the pressure difference reduction groove before reaching the permeated liquid outlet.

According to a fifth invention, the communication groove and the channel groove cross each other like a letter T.

With this configuration, at an intersection where the communication groove and the channel groove cross each other, the filtration membrane is supported by the two corners of cells surrounded by the communication grooves and the channel grooves and one side edge of the channel groove (i.e., supported by two points and one linear portion). Thus an area for supporting the filtration membrane is larger than in the case where the communication groove and the channel groove cross each other like a letter X. It is therefore possible to suppress extension of the filtration membrane and prevent the filtration membrane from coming into the channel grooves or the communication grooves and reducing the effective channel cross-sectional areas of these grooves.

According to a sixth invention, the filtration membrane, the channel groove pattern, and the pressure difference reduction groove are provided on each surface of the filtration plate, and the pressure difference reduction groove includes communication holes communicating with both sides of the filtration plate.

With this configuration, a difference in suction pressure between the front and back sides of the filtration plate is reduced through the communication holes, thereby suppressing an imbalance in filtering on the front and back sides of the filtration plate.

For example, in the case where a deposit occurs on one surface of the membrane cartridge, the permeated liquid cannot be obtained from the blocked area of the membrane surface. Thus on the one surface of the membrane cartridge, an effective filtration membrane area for obtaining the permeated liquid is smaller than an effective filtration membrane area for obtaining the permeated liquid on the other surface of the membrane cartridge. Consequently, the mean value of suction pressures on the filtration membrane surface on the one surface is larger than the mean value of suction pressures on the filtration membrane surface on the other surface.

Therefore, the permeated liquid having passed through the filtration membrane on the other surface partially flows through the channel grooves on the other surface, flows into the pressure difference reduction groove on the one surface from the pressure difference reduction groove on the other surface through the communication holes, flows through the channel grooves on the one surface with the permeated liquid having passed through the filtration membrane on the one surface, and is collected out of the membrane cartridge from the permeated liquid outlet.

When the membrane surface is blocked thus, the communication holes act as bypass channels through which the permeated liquid on the unblocked side partially flows to the blocked side by using a suction pressure on the blocked side of the membrane cartridge, and then the permeated liquid is taken out from the permeated liquid outlet. Thus even when an effective filtration membrane area on one surface of the membrane cartridge is reduced by a blockage on the membrane surface, it is possible to reduce a difference in the amount of permeated liquid between the front and back sides of the membrane cartridge.

Advantageous Effects of Invention

As has been discussed, according to the present invention, filtration membranes can be effectively used by efficiently collecting a permeated liquid. Further, it is possible to reduce a difference in the amount of permeated liquid between the front and back sides of a membrane cartridge, the difference being caused by, e.g., a blockage on a membrane surface.

BRIEF DESCRIPTION OF DRAWINGS

FIG. 9 is a partially cut front view of a membrane cartridge according to the related art.

DESCRIPTION OF EMBODIMENTS

Referring to FIGS. 1 to 4, a first embodiment of the present invention will be described below.

Figure 1:
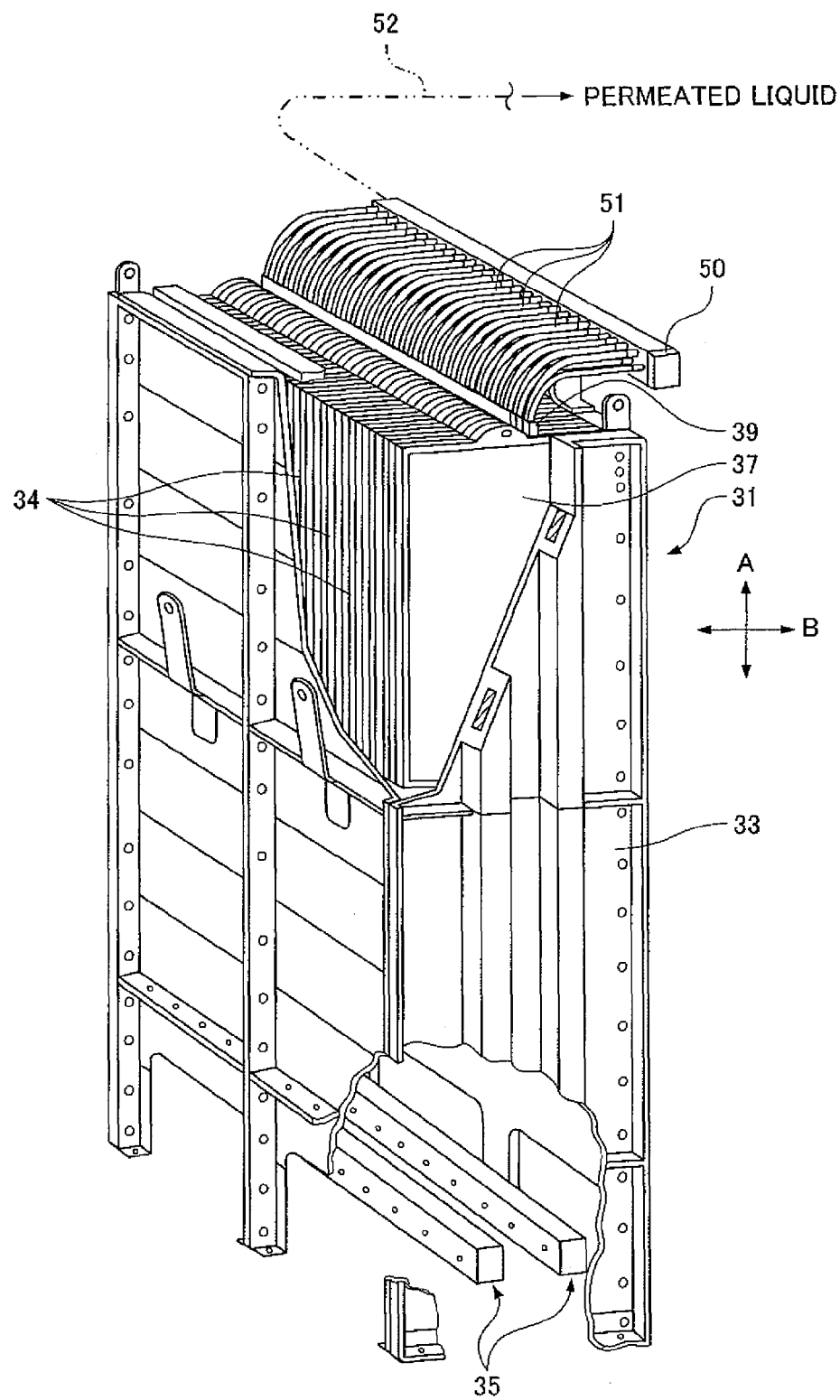
FIG. 1 is a partially cut perspective view of a membrane separator including membrane cartridges according to a first embodiment of the present invention.

As shown in FIG. 1, a submerged membrane separator 31 is provided in a reaction tank in which activated sludge treatment is performed on sewage or the like. The membrane separator 31 includes: a square main-unit casing 33 whose upper and lower ends are opened; multiple membrane cartridges 34 of an organic flat-membrane type which are provided in the main-unit casing 33; and an air diffuser 35 provided below the membrane cartridges 34.

The adjacent membrane cartridges 34 having opposed membrane surfaces are arranged in parallel at predetermined intervals. Although the membrane cartridges 34 are spaced at the predetermined intervals, the membrane cartridges 34 may be contacted with each other at least on the side edges of the membrane cartridges 34. In this case, one side of the main-unit casing 33 may be opened or the main-unit casing 33 may be eliminated.

Figure 2:
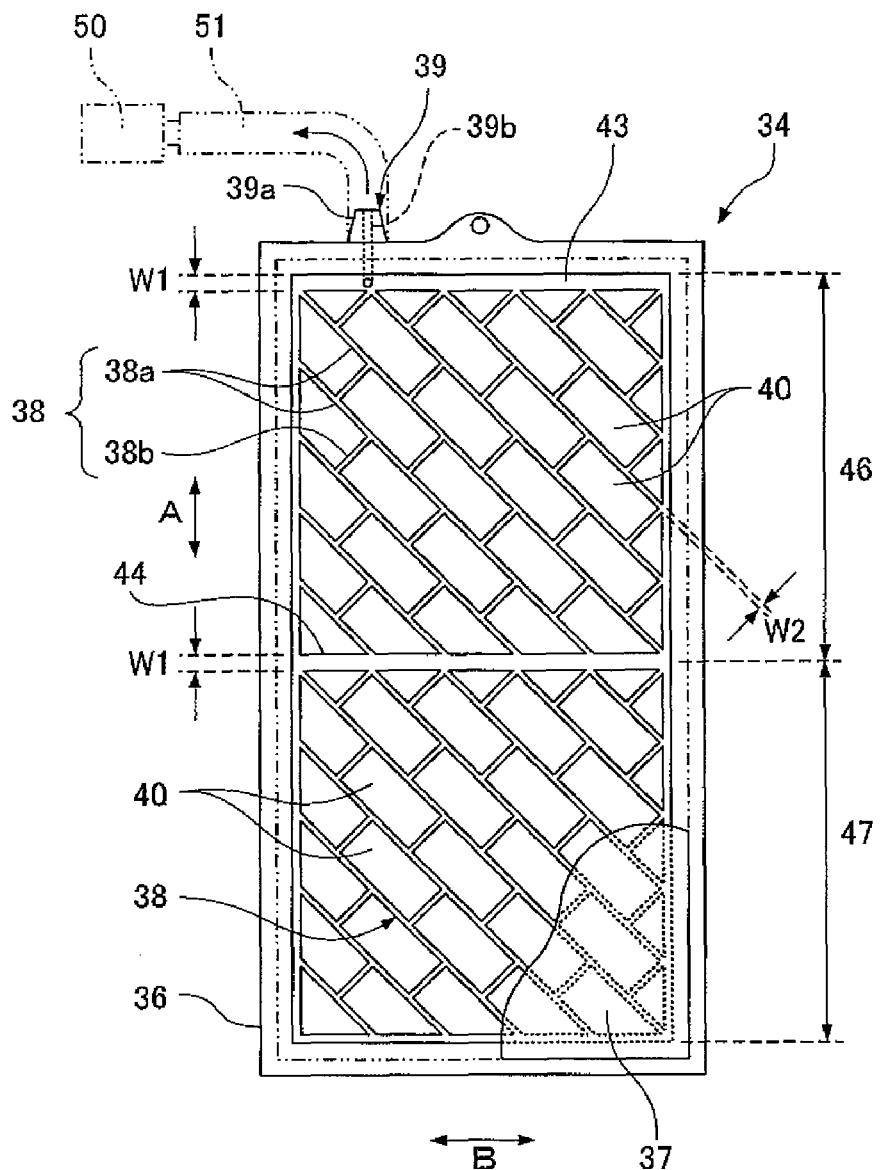
FIG. 2 is a partially cut front view of the membrane cartridge.

As shown in FIG. 2, the membrane cartridge 34 includes: a filtration plate 36 shaped like a rectangle extended in vertical direction A (an example of a shape whose length and width are different), and filtration membranes 37 attached to both surfaces of the filtration plate 36. The periphery of the filtration membrane 37 is fixed to the filtration plate 36 by, e.g., welding or bonding.

On each surface of the filtration plate 36, a channel groove pattern 38 and first and second header grooves 43 and 44 are formed. The first and second header grooves 43 and 44 average suction pressures in width direction B of the filtration plate surface. A permeated liquid having passed through the filtration membrane 37 flows through the channel groove pattern 38.

The channel groove pattern 38 and the header grooves 43 and 44 are covered with the filtration membrane 37. On the upper end of the filtration plate 36, a permeated liquid outlet nozzle 39 (an example of a permeated liquid outlet) is provided that collects the permeated liquid in the channel groove pattern 38 and discharges the permeated liquid out of the membrane cartridge 34.

Figure 3:
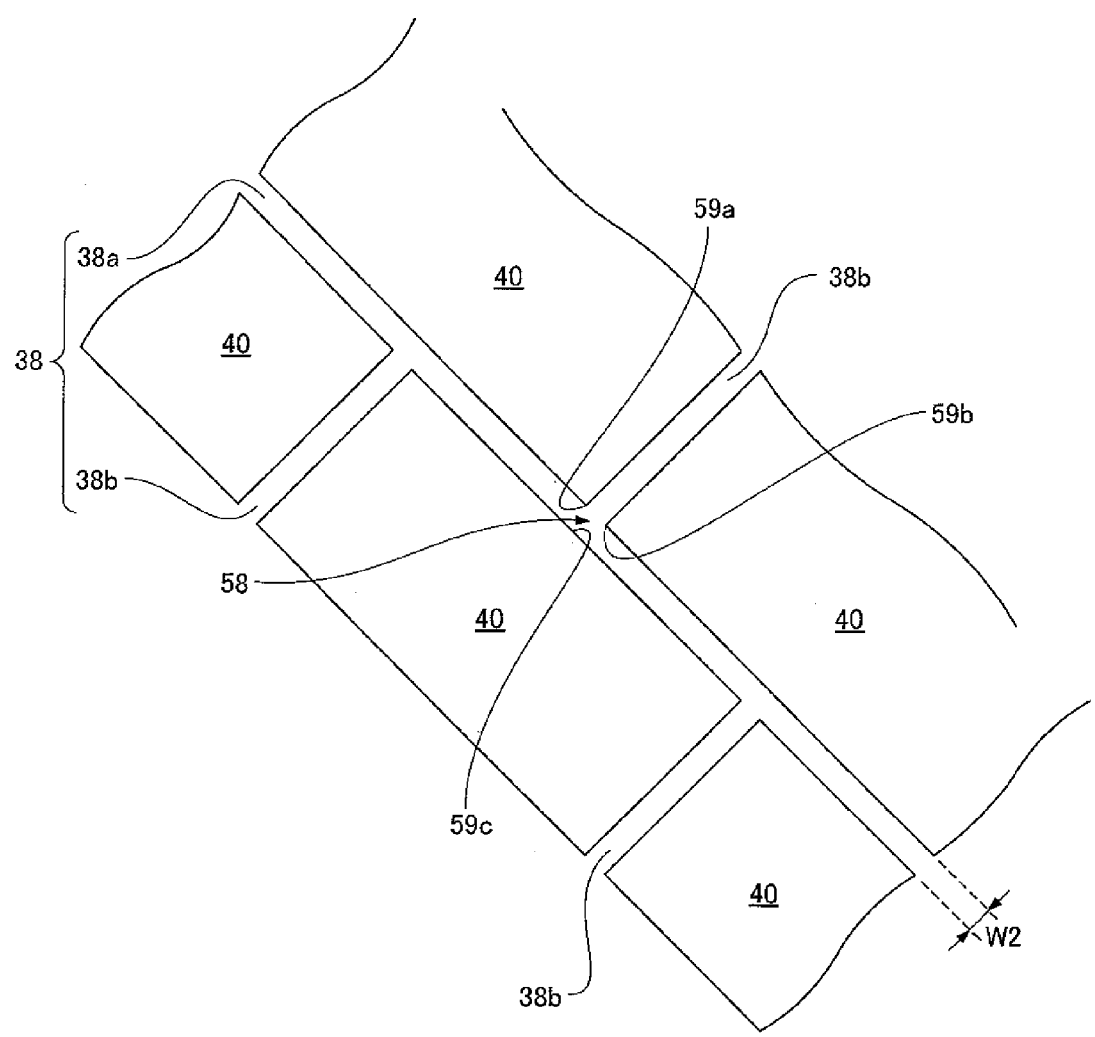
FIG. 3 is an enlarged view showing an intersection of a channel groove and a communication groove in a channel groove pattern of the membrane cartridge.

The channel groove pattern 38 is formed by multiple linear channel grooves 38a that are arranged in parallel and inclined with respect to the vertical direction, and multiple communication grooves 38b connecting the adjacent channel grooves 38a. As shown in FIGS. 2 and 3, by forming the channel groove pattern 38, multiple rectangular cells 40 surrounded by the channel grooves 38a and the communication grooves 38b are formed on both surfaces of the filtration plate 36. The channel groove 38a and the communication groove 38b cross each other like a letter T, and the channel cross-sectional area of the channel groove 38a is equal to that of the communication groove 38b.

The first and second header grooves 43 and 44 are linear grooves that are parallel to the upper and lower end sides of the filtration plate 36 and are extended in the width direction B of the filtration plate 36. The header grooves 43 and 44 are formed from one side to the other side of the filtration plate 36. Further, the second header groove 44 (an example of a pressure difference reduction groove) is formed so as to cross the area of the channel groove pattern 38 in the width direction B. The area of the channel groove pattern 38 is divided into an upper water collection area 46 and a lower water collection area 47 by the second header groove 44.

The permeated liquid outlet nozzle 39 includes a nozzle body 39a protruding upward from the upper end of the filtration plate 36, and a hole 39b formed on the nozzle body 39a. One end of the hole 39b is opened on the end of the nozzle body 39a and the other end of the hole 39b communicates with the first header groove 43. With this configuration, the permeated liquid outlet nozzle 39 and the second header groove 44 communicate with each other through the first header groove 43 and the channel grooves 38a and the communication grooves 38b in the upper water collection area 46. The channel grooves 38a in the lower water collection area 47 communicate with the second header groove 44.

Width W1 of the first and second header grooves 43 and 44 is larger than width W2 of the channel groove 38a. The first and second header grooves 43 and 44 have the same depth as the channel groove 38a. Thus the channel cross-sectional areas of the header grooves 43 and 44 are larger than that of the channel groove 38a. The first header groove 43 has the same channel cross-sectional area as the second header groove 44.

As shown in FIG. 1, above one side of the main-unit casing 33, a water collecting pipe 50 is provided that collects the permeated liquid sucked from the permeated liquid outlet nozzles 39 of the membrane cartridges 34. The permeated liquid outlet nozzle 39 and the water collecting pipe 50 are connected to each other via a connecting pipe 51.

To the water collecting pipe 50, a delivery pipe 52 for delivering the permeated liquid out of the tank is connected. On the delivery pipe 52, a suction pump is provided that generates a suction force (negative pressure) in the membrane cartridge 34 to suck the permeated liquid. Without using a suction pump, a suction pressure may be generated by using the hydraulic head pressure of a liquid to be treated 53 in a reaction tank 32 as a filtering pressure.

The effect of the configuration will be described below.

In a filtering operation, the suction pump is driven to draw the permeated liquid through the permeated liquid outlet nozzle 39 while air is diffused from the air diffuser 35. Thus a suction pressure is applied to the header grooves 43 and 44, the channel grooves 38a, and the communication grooves 38b through the permeated liquid outlet nozzle 39, reducing a pressure in the membrane cartridge 34. As a result, solid matters such as sludge in the liquid to be treated 53 are captured by the filtration membrane 37 and removed from the surface of the filtration membrane 37 by air diffusion. At this point, the permeated liquid having passed through the filtration membrane 37 flows through the first and second header grooves 43 and 44, the channel grooves 38a, and the communication grooves 38b, is collected out of the membrane cartridge 34 from the permeated liquid outlet nozzle 39, is collected to the water collecting pipe 50 through the connecting pipe 51, and is delivered out of the tank from the water collecting pipe 50 through the delivery pipe 52.

At this point, the permeated liquid flowing through the channel grooves 38a and the communication grooves 38b of the lower water collection area 47 (that is, the water collection area farther from the permeated liquid outlet nozzle 39 than the second header groove 44) is collected to the second header groove 44 from the channel grooves 38a before reaching the permeated liquid outlet nozzle 39. The channel cross-sectional area of the second header groove 44 is larger than that of the channel groove 38a and the second header groove 44 crosses the area of the channel groove pattern 38 in the width direction B, so that the flow velocity of the permeated liquid in the second header groove 44 is lower than the flow velocity of the permeated liquid in the channel grooves 38a.

With this configuration, variations in suction pressure in the upper water collection area 46 (that is, the water collection area closer to the permeated liquid outlet nozzle 39 than the second header groove 44) are averaged and reduced in the longitudinal direction of the second header groove 44 (i.e., in the width direction B of the filtration plate surface). Thus suction pressures in the lower water collection area 47 are averaged in the longitudinal direction of the header groove 44 (i.e., in the width direction B of the filtration plate surface), so that the permeated liquid can be effectively obtained by using the overall membrane surface.

Figure 4:
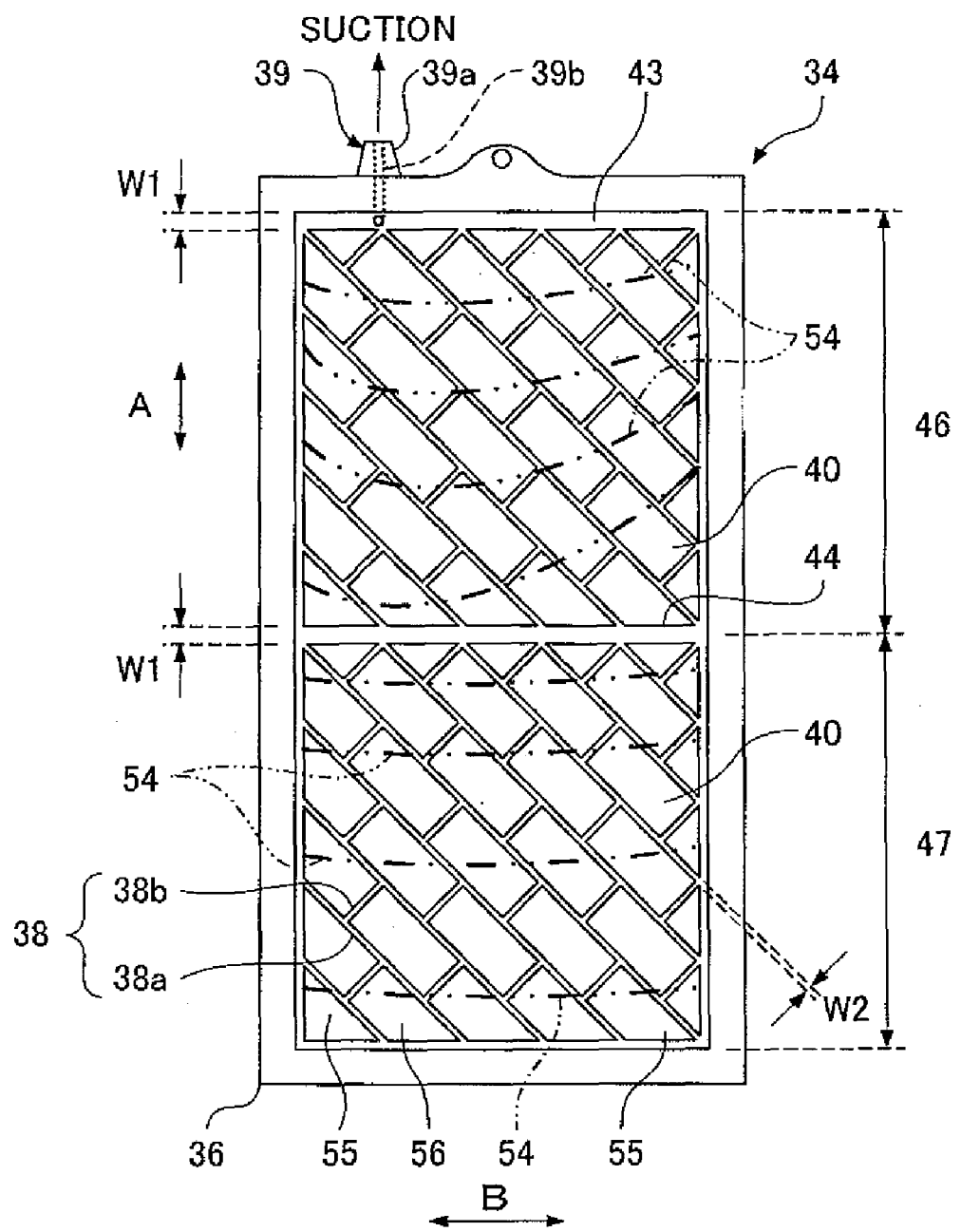
FIG. 4 is a front view showing the filtration plate of the membrane cartridge.

FIG. 4 shows the distribution of suction pressures generated on the surface of the filtration plate 36. The suction pressures are averaged thus in the width direction B of the surface of the filtration plate 36, so that constant-pressure lines 54 in the lower water collection area 47 become more flattened than in the membrane cartridge of the related art. Therefore, in the lower water collection area 47, a difference (variations) in suction pressure in the width direction B of the surface of the filtration plate 36 can be reduced and the permeated liquid can be efficiently collected from lower parts 55 on both side edges of the filtration plate 36 in the width direction B, leading to effective use of the overall surface of the filtration membrane 37, whereas a permeated liquid is hard to effectively obtain from the filtration membrane in the related art.

The permeated liquid collected to the second header groove 44 and the permeated liquid having passed through the filtration membrane 37 in the upper water collection area 46 flow through the channel grooves 38a and the communication grooves 38b of the upper water collection area 46, are collected to the first header groove 43, and flow into the hole 39b of the permeated liquid outlet nozzle 39 from the first header groove 43.

Since the channel grooves 38a are linearly formed in the upper and lower water collection areas 46 and 47, the permeated liquid smoothly flows through the channel grooves 38a and the channel resistance is reduced.

As shown in FIG. 3, at an intersection 58 where the channel groove 38a and the communication groove 38b cross like a letter T, the filtration membrane 37 is supported by corners 59a and 59b of the two adjacent cells 40 and one side edge 59c of the channel groove 38a (i.e., supported by two points and one linear portion). Therefore, when a suction pressure is applied to the inside of the membrane cartridge 34, the filtration membrane 37 can be more sufficiently supported at the intersection 58 than in the case where, for example, the channel groove and the communication groove cross like a letter X and the filtration membrane is supported only by the corners of multiple cells (supported by multiple points). It is thus possible to prevent the filtration membrane 37 at the intersection 58 from coming into the channel groove 38a and reducing the effective channel cross-sectional area of the channel groove 38a.

Figure 5:
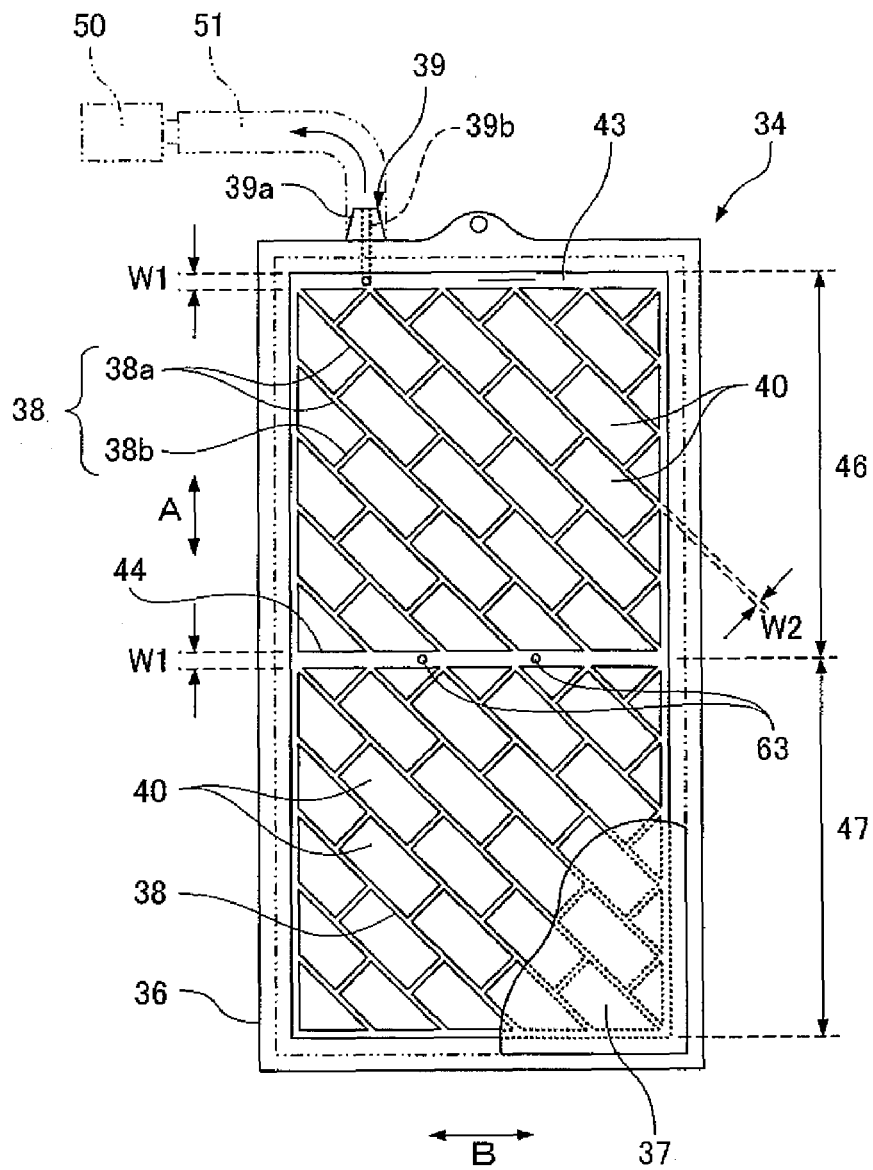
FIG. 5 is a partially cut front view of a membrane cartridge according to a second embodiment of the present invention.
Figure 6:
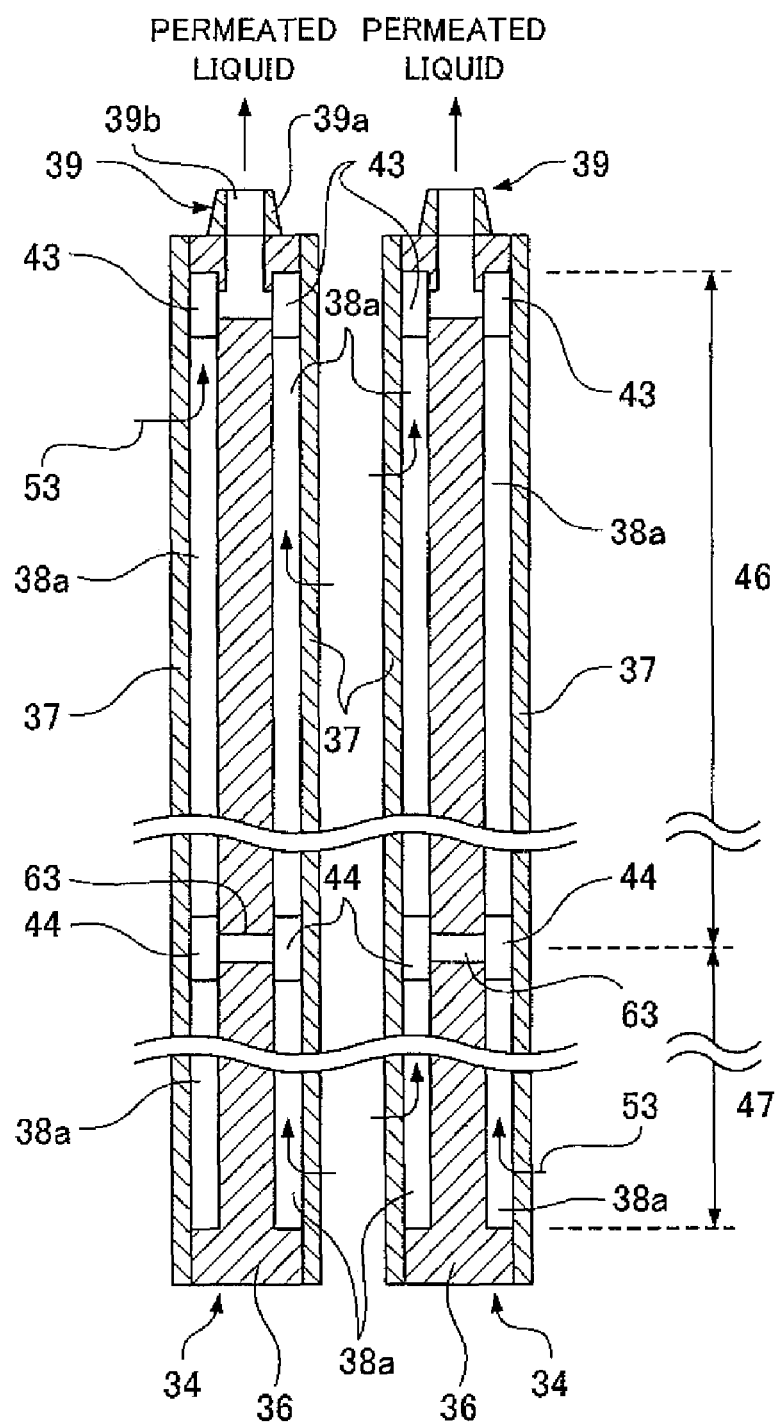
FIG. 6 is a longitudinal sectional view showing the sides of the two membrane cartridges.
Figure 7:
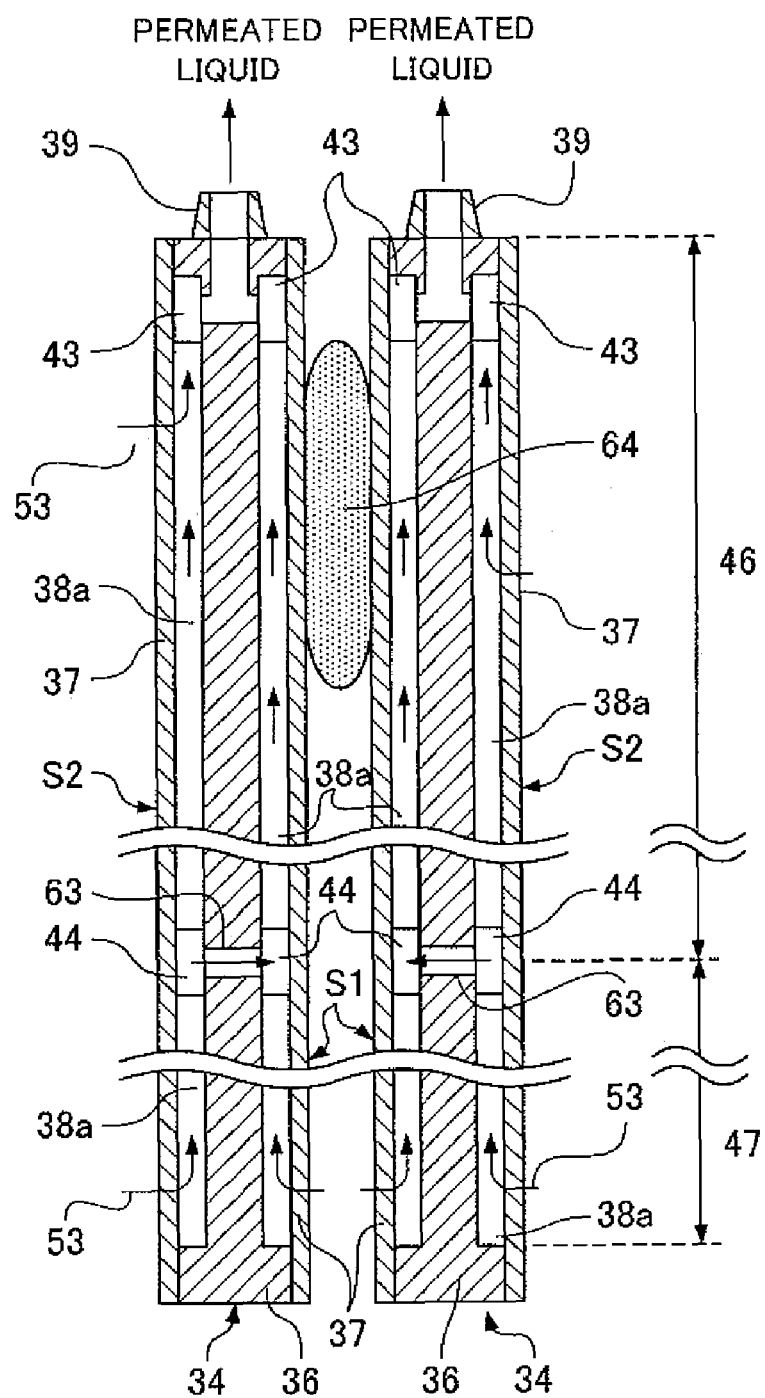
FIG. 7 is a longitudinal sectional view showing the sides of the two membrane cartridges with a blockage occurring between the membrane surfaces.

Referring to FIGS. 5 to 7, a second embodiment of the present invention will be described below.

In a second header groove 44, multiple communication holes 63 (two communication holes in FIG. 5) are formed that communicate with both sides of a filtration plate 36. As shown in FIG. 6, one end of the communication hole 63 is opened in the second header groove 44 on one of the front and back sides of the filtration plate 36 and the other end of the communication hole 63 is opened in the second header groove 44 on the other side of the filtration plate 36.

The effect of the configuration will be described below.

A difference in suction pressure between the front and back sides of the filtration plate 36 is reduced through the communication holes 63, thereby suppressing an imbalance in filtering on the front and back sides of the filtration plate 36.

For example, as shown in FIG. 7, in the case where a deposit 64 occurs on a filtration membrane 37 on one surface S1 of a membrane cartridge 34 and blocks the membrane surface in an upper water collection area 46 on the one surface S1 of the membrane cartridge 34, a permeated liquid cannot be obtained from the blocked area of the membrane surface. Thus on the one surface S1 of the membrane cartridge 34, an effective filtration membrane area for obtaining the permeated liquid is smaller than that on the other surface S2 of the membrane cartridge 34. Consequently, the mean value of suction pressures on the membrane surface of the filtration membrane 37 on the one surface S1 is larger than that on the other surface S2.

Therefore, a part of the permeated liquid having passed through the filtration membrane 37 on the other surface S2 flows through channel grooves 38a on the other surface S2, flows into the second header groove 44 on the one surface S1 from the second header groove 44 on the other surface S2 through the communication holes 63, flows through the channel grooves 38a on the one surface S1 with the permeated liquid having passed through the filtration membrane 37 on the one surface S1, and is collected out of the membrane cartridge 34 from a permeated liquid outlet nozzle 39.

When the membrane surface is blocked thus, the communication holes 63 act as bypass channels through which a part of the permeated liquid on the unblocked side (S2) flows to the blocked side (S1) by using a suction pressure on the blocked side (S1) of the membrane cartridge 34, and then the permeated liquid is taken out from the permeated liquid outlet nozzle 39. Thus even when the effective filtration membrane area of one of the front and back sides of the membrane cartridge 34 is reduced by a blockage on the membrane surface, it is possible to reduce a difference in the amount of permeated liquid between the front and back sides of the membrane cartridge 34.

As shown in FIG. 5, the two communication holes 63 are formed in the second embodiment. At least three communication holes or only one communication hole may be formed.

Referring to FIGS. 8A to 8D, the following will describe third to sixth embodiments of the present invention.

Figure 8A:
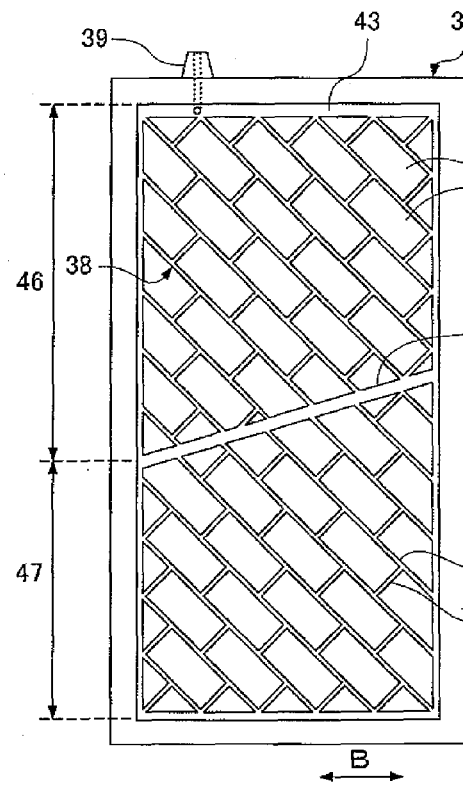
FIG. 8A is a front view showing the filtration plate of a membrane cartridge according to a third embodiment of the present invention.

In the first embodiment, as shown in FIG. 2, the second header groove 44 crossing the area of the channel groove pattern 38 in the width direction B is formed in parallel with the upper and lower end sides of the filtration plate 36, whereas in the third embodiment, as shown in FIG. 8A, a second header groove 44 crossing the area of a channel groove pattern 38 in width direction B is inclined with respect to the upper and lower end sides of a filtration plate 36.

Figure 8B:
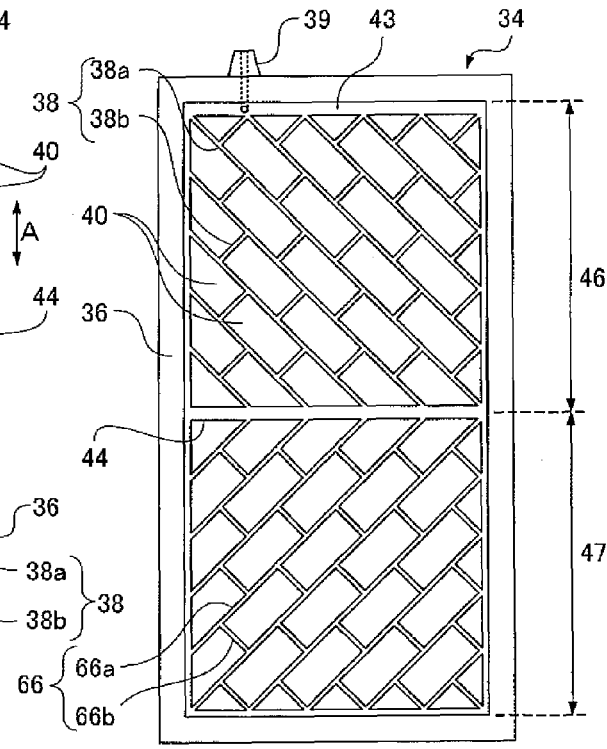
FIG. 8B is a front view showing the filtration plate of a membrane cartridge according to a fourth embodiment of the present invention.

In the first embodiment, as shown in FIG. 2, the channel groove pattern 38 of the upper water collection area 46 and the channel groove pattern 38 of the lower water collection area 47 are identical to each other, whereas in the fourth embodiment, as shown in FIG. 8B, a channel groove pattern 38 of an upper water collection area 46 and a channel groove pattern 66 of a lower water collection area 47 may be different from each other. The channel groove pattern 66 is formed by multiple channel grooves 66a and multiple communication grooves 66b.

In the channel groove pattern 38 of the upper, water collection area 46, channel grooves 38a are inclined to one side with respect to the vertical direction and are directed to a permeated liquid outlet nozzle 39. The channel grooves 66a of the channel groove pattern 66 in the lower water collection area 47 are inclined with respect to the vertical direction, in the opposite direction from the channel grooves 38a (to the other side).

Figure 8C:
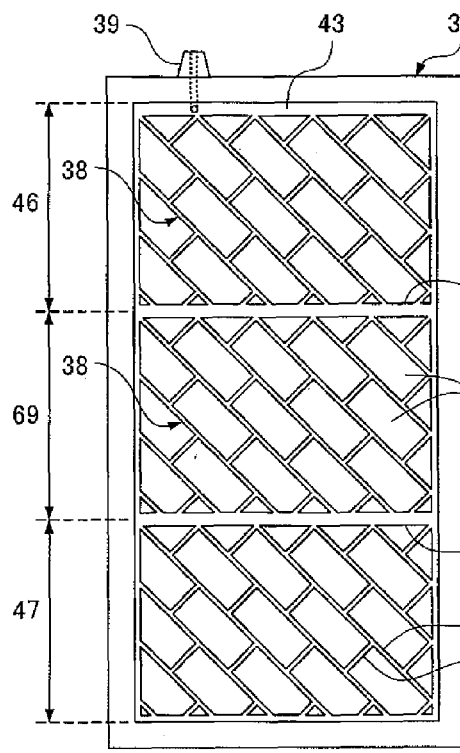
FIG. 8C is a front view showing the filtration plate of a membrane cartridge according to a fifth embodiment of the present invention.
Figure 8D:
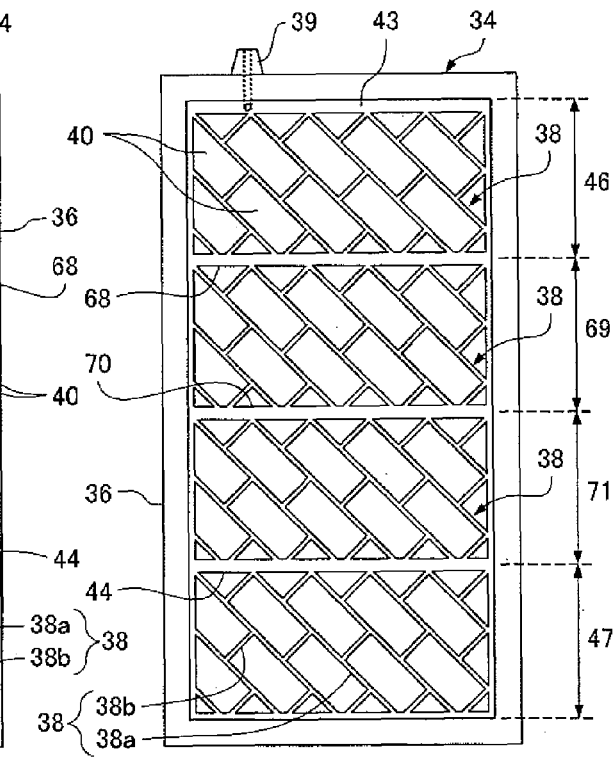
FIG. 8D is a front view showing the filtration plate of a membrane cartridge according to a sixth embodiment of the present invention.
Figure 10:
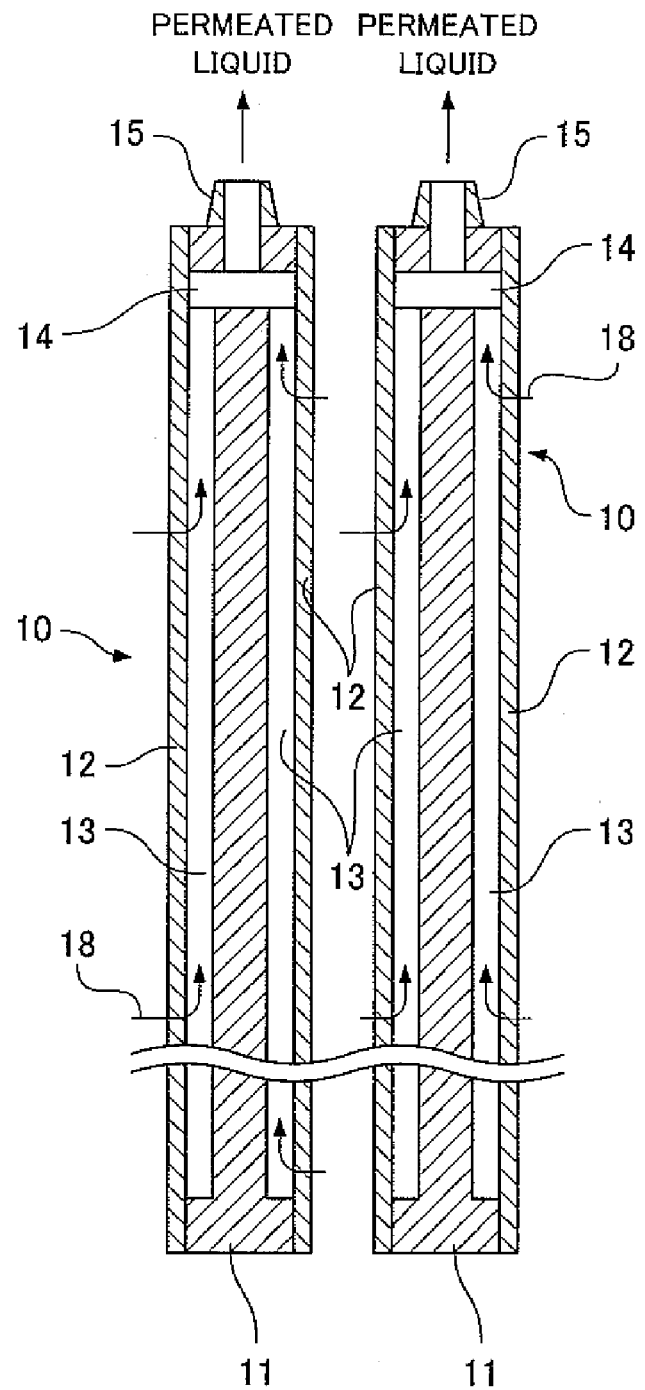
FIG. 10 is a longitudinal sectional view showing the sides of the two membrane cartridges.
Figure 11:
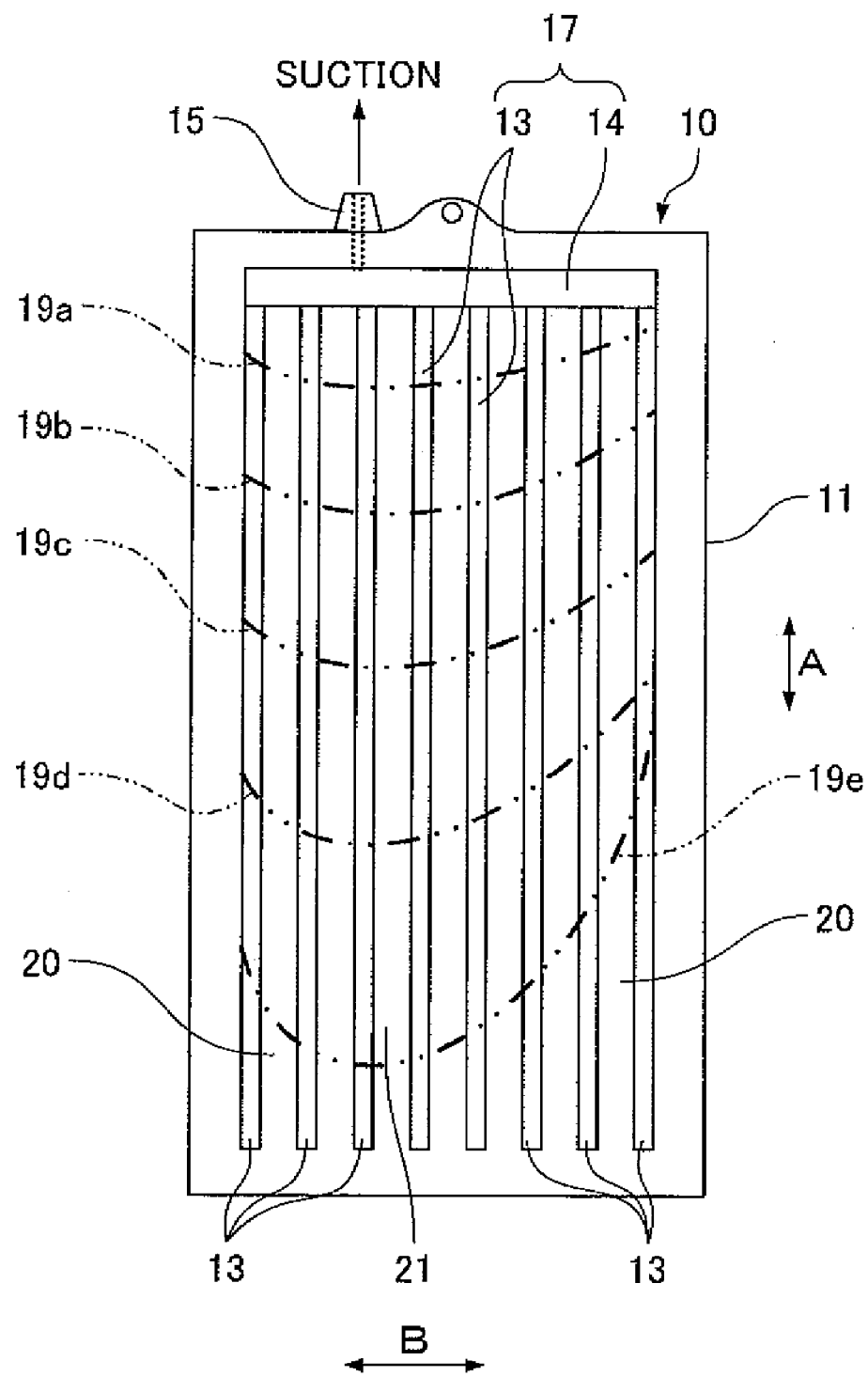
FIG. 11 is a front view showing the filtration plate of the membrane cartridge.
Figure 12:
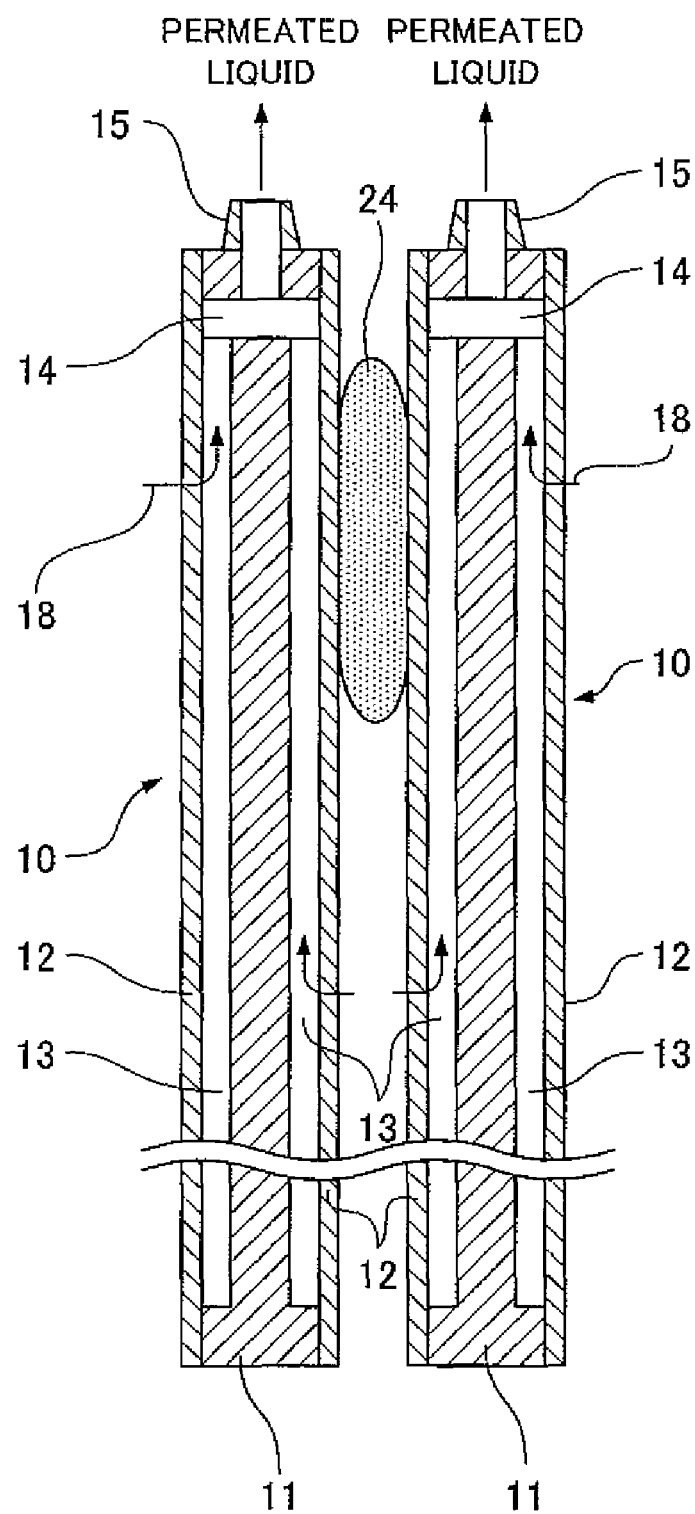
FIG. 12 is longitudinal sectional view showing the sides of the two membrane cartridges with a blockage occurring between the membrane surfaces.

In the first embodiment, as shown in FIG. 2, the two upper and lower header grooves 43 and 44 and the two upper and lower water collection areas 46 and 47 are provided on the filtration plate surface of the filtration plate 36, whereas in the fifth embodiment, as shown in FIG. 8C, three header grooves 43, 44, and 68 and three water collection areas 46, 47, and 69 may be vertically provided on the filtration plate surface of a filtration plate 36. In the sixth embodiment, as shown in FIG. 8D, four header grooves 43, 44, 68, and 70 and four water collection areas 46, 47, 69, and 71 may be vertically provided on the filtration plate surface of a filtration plate 36. With this configuration, the header grooves 44, 68, and 70 act as pressure difference reduction grooves, so that suction pressures are averaged in width direction B of the filtration plate surface by the header grooves 43, 44, 68, and 70. Five or more header grooves may be formed and five or more water collection areas may be formed.

In the third to sixth embodiments, communication holes 63 may be formed in the header grooves of the membrane cartridge 34 as in the second embodiment.

In the foregoing embodiments, the filtration membrane 37, the channel groove patterns 38 and, 66, and the header grooves 43, 44, 68, and 70 are provided on each of the surfaces of the filtration plate 36. The filtration membrane, the channel groove patterns, and the header grooves may be provided only on one of the filtration plate surfaces. Further, the header grooves 43, 44, 68, and 70 may penetrate both filtration plate surfaces of the filtration plate 36. The depths of the header grooves 43, 44, 68, and 70 are not particularly limited as long as the capacities of the header grooves are large enough to act as headers.

In the foregoing embodiments, a spacer (e.g., a nonwoven fabric or sponge) may be disposed between the filtration plate 36 and the filtration membrane 37 to prevent the filtration membrane 37 from closely contacting with the filtration plate 36.

In the foregoing embodiments, the permeated liquid outlet nozzle 39 is provided on the upper end of the filtration plate 36. The permeated liquid outlet nozzle 39 may be provided near the upper end of the filtration plate 36, e.g., on the upper part of the side edge of the filtration plate 36.

In the foregoing embodiments, the membrane cartridges 34 are disposed in the membrane separator 31 such that the long sides of the membrane cartridges 34 are extended in the vertical direction A. The membrane cartridges 34 may be disposed in the membrane separator 31 with the long sides extended in the width direction B.

The invention claimed is:

1. A membrane cartridge constituting a submerged membrane separator, the membrane cartridge comprising:
   a filtration membrane provided at least on one surface of a filtration plate;
   a channel groove pattern formed on the surface of the filtration plate covered with the filtration membrane, the channel groove pattern allowing passage of a permeated liquid having passed through the filtration membrane; and
   a permeated liquid outlet provided on a circumferential edge of the filtration plate, the permeated liquid outlet collecting and taking out the permeated liquid having passed through the channel groove pattern,
   wherein the channel groove pattern comprises multiple channel grooves,
   the filtration plate comprises a pressure difference reduction groove crossing an area where the channel groove pattern is formed,
   the area where the channel groove pattern is formed is divided into multiple water collection areas by the pressure difference reduction groove,
   the pressure difference reduction groove communicates with the permeated liquid outlet only through the channel grooves, and
   the pressure difference reduction groove has a channel cross-sectional area larger than the cross-sectional area of the channel groove.

2. The membrane cartridge according to claim 1, wherein the filtration plate has a shape whose length and width are different,
   the permeated liquid outlet is provided on or near an upper end of the filtration plate when the filtration plate is placed upright such that a longitudinal direction of the filtration plate is oriented in a vertical direction, and the pressure difference reduction groove is provided from one side to the other side of the filtration plate.

3. The membrane cartridge according to claim 2, wherein the channel grooves are linearly formed and arranged in parallel.

4. The membrane cartridge according to claim 3, wherein the channel groove pattern comprises multiple communication grooves connecting the adjacent channel grooves.

5. The membrane cartridge according to claim 4, wherein the communication groove and the channel groove cross each other like a letter T.

6. The membrane cartridge according to claim 1, wherein the filtration membrane, the channel groove pattern, and the pressure difference reduction groove are provided on each filtration plate surface of the filtration plate, and the pressure difference reduction groove comprises communication holes communicating with both sides of the filtration plate.

* * * * *